(12) United States Patent
Sun et al.

(10) Patent No.: US 12,032,617 B2
(45) Date of Patent: Jul. 9, 2024

(54) ONTOLOGY CREATING APPARATUS, METHOD, AND PROGRAM

(71) Applicant: NIPPON TELEGRAPH AND TELEPHONE CORPORATION, Tokyo (JP)

(72) Inventors: Jingyu Sun, Musashino (JP); Ikuo Yamasaki, Musashino (JP); Shoko Katayama, Musashino (JP); Seiji Omori, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 365 days.

(21) Appl. No.: 17/414,314

(22) PCT Filed: Dec. 10, 2019

(86) PCT No.: PCT/JP2019/048281
§ 371 (c)(1),
(2) Date: Jun. 15, 2021

(87) PCT Pub. No.: WO2020/129752
PCT Pub. Date: Jun. 25, 2020

(65) Prior Publication Data
US 2022/0035850 A1    Feb. 3, 2022

(30) Foreign Application Priority Data

Dec. 18, 2018 (JP) .................... 2018-236532

(51) Int. Cl.
*G06F 16/00*    (2019.01)
*G06F 16/36*    (2019.01)
*G06F 40/237*   (2020.01)

(52) U.S. Cl.
CPC .......... *G06F 16/367* (2019.01); *G06F 40/237* (2020.01)

(58) Field of Classification Search
CPC ........ G06F 16/367; G06F 40/237; G06F 8/10; G06F 40/30
See application file for complete search history.

(56) References Cited

U.S. PATENT DOCUMENTS 8,244,769 B2 * 8/2012 Hosomi ................ G06F 16/367
707/794
11,295,071 B2 * 4/2022 Munro .................. G06F 3/0482
(Continued)

OTHER PUBLICATIONS

Toshio Ueda and Mitsuru Ikeda, Conceptualizational Aspect: A Lead on Ontology Constructing, Materials of the Japanese Society for Artificial Intelligence, SIG-SWO-A602-03, Nov. 21, 2006, pp. 03-01-03-10.
(Continued)

*Primary Examiner* — Debbie M Le
(74) *Attorney, Agent, or Firm* — Harness, Dickey & Pierce, P.L.C.

(57) ABSTRACT

An ontology creation apparatus according to an embodiment includes: a first selection unit that receives an input operation that is performed based on information that represents definitions of candidate classes of ontology; an acquisition unit that acquires a candidate class of a subject when the selected class is determined as the object, based on information that represents definitions of properties that indicate connection relationships between classes that serve as objects and classes that serve as subjects; a second selection unit that receives an input operation for selecting an instance that belongs to a class of a subject when the selected class is determined as an object, based on the candidate; a relationship setting unit that sets a connection relationship between instances that belong to the selected class and the (Continued)

selected instance; and an output unit that creates and outputs ontology that indicates the selected class, the instance, and the set connection relationship.

5 Claims, 13 Drawing Sheets

(56) References Cited

U.S. PATENT DOCUMENTS

2017/0185674 A1\* 6/2017 Tonkin ................. G06F 16/328
2020/0372057 A1\* 11/2020 Tonkin ................. G06F 16/211
2021/0319372 A1\* 10/2021 Watt ...................... G06F 16/212

OTHER PUBLICATIONS

Kouji Kozaki and Riichiro Mizoguchi, A Present State of Ontology Development Tools, Journal of the Japanese Society for Artificial Intelligence, vol. 20, No. 6, 2005.

\* cited by examiner

ONTOLOGY CREATING APPARATUS, METHOD, AND PROGRAM

CROSS-REFERENCE TO RELATED APPLICATIONS

This application is a 371 U.S. National Phase of International Application No. PCT/JP2019/048281 filed on Dec. 10, 2019, which claims priority to Japanese Application No. 2018-236532 filed on Dec. 18, 2018. The entire disclosures of the above applications are incorporated herein by reference.

TECHNICAL FIELD

Embodiments of the present invention relate to an ontology creation apparatus, method, and program.

BACKGROUND ART

In recent years, ontology has been widely utilized as a tool that can express meanings and a system not only in the field of WEB technologies but also in various fields including the field of IoT (Internet of Things). However, it is difficult to manually create a language for describing ontology (RDF (Resource Description Framework), JSON-LD, etc.), and when creating such a language, it is impossible to appropriately set restrictions that are required to be applied to application programs (or applications) with which ontology is operated.

Here, ontology construction in IoT will be described. FIG. 14 is a diagram illustrating an example of ontology construction in IoT. An IoT platform is an example on which ontology is used as a means for expressing the meanings and system of IoT data.

For example, a conversion proxy is provided between a common platform (PF) that is commonly provided for each business operator serving as a data provider and that exchanges data with an application, and a PF/device that conforms to another standard. This conversion proxy uses ontology data that describes the data structure common to each standard, to exchange data between the common platform (PF) and a PF/device that conforms to another standard.

Here, it is assumed that the IoT device transmits and receives data via a service. According to another type of standard that has a RESTful interface, each DataPoint is defined under the service. Also, in the cases of complex IoT devices, a "ConsistsOf" field is used to represent child devices and child services to define hierarchical relationships.

For example, the class "Device" and the class "Service" are associated with each other using the ObjectProperty "hasService", the class "Service" and the class "OutputDataPoint" are associated with each other using the ObjectProperty "hasOutputDataPoint", and the class "Service" and the class "InputDataPoint" are associated with each other using the ObjectProperty "hasInputDataPoint". The class "Service" and the literal "API (Application Programming Interface)" are associated with each other using the DatatypeProperty "Protocol:hasAPI". The ObjectProperty represents a relationship between classes and a relationship between instances belonging to a class.

When ontology is used to realize mutual cooperation, data for a PF/device that conforms to another standard is to be formalized. In this formalization, there are certain restrictions such as the restrictions (1) to (3) shown below.

Restriction (1): Class is limited to Thing, Device, Service, DataPoint, etc.

Restriction (2): ObjectProperty between classes is constant.

For example, {Device, hasService, Service} is appropriate, whereas {Device, hasInputDataPoint, InputDataPoint} is inappropriate.

Restriction (3): DatatypeProperty that can be given to classes is constant.

For example, {Service, hasAPI, API} is appropriate, whereas {Device, hasAPI, API} is inappropriate.

In a conventional ontology construction process, for example, (1) intuitive understanding is expressed from the ontology construction target world, (2) the intuitive understanding is analyzed based on the result, and (3) ontology is formalized based on the result of analysis (for example, see NPL 1 and NPL 2). Due to the high degree of dependence on humans of such a process, the accuracy of formalized ontology is unlikely to be guaranteed.

Here, the procedures of the OntoClean methodology that supports (2) the analysis of intuitive understanding and (3) the formalization of ontology will be described.

First, for ontology that has not been normalized, a meta-property that represents the concept type of each concept is determined.

Next, since restrictions are defined between meta properties, consistency is verified through DL (Description Logic) inference according to the restrictions.

The above determination and verification are repeated until the found inconsistencies are corrected and no inconsistency occurs.

CITATION LIST

Non Patent Literature

[NPL 1] Toshio UEDA, Mitsuru IKEDA, Conceptualizational Aspect: A Lead on Ontology Constructing, Materials for a research conference held by The Japanese Society for Artificial Intelligence, SIG-SWO-A602-03

[NPL 2] Kouji Kozaki, Riichiro Mizoguchi, A Present State of Ontology Development Tools

SUMMARY OF THE INVENTION

Technical Problem

Problems in conventional construction processes will be described in (1) to (3) below.

(1) In order to determine the meta-property of a concept from the expressed intuitive understanding, it is necessary to have the ability to presume and consider various situations from an objective point of view. It is not easy to acquire this ability.

(2) In order to analyze intuitive understanding, it is necessary to have a high degree of ontological literacy.

(3) In the formalization of ontology, in order to correct ambiguous or incorrect intuitive expressions, it is necessary to be supported through inference such as a description logic (rules regarding restrictions between meta properties are defined in advance).

Inconsistencies or incorrect descriptions are formed after formalization, and therefore there is no preventive measure at the time of creation.

Next, a conventional ontology construction tool and specification procedures will be described. A conventional ontology construction tool newly creates classes such as Device/Service, and instances, ObjectProperty items, and DatatypeProperty items, for example. Next, the ontology construction tool adds a label, which is a text that describes a class. For example, the label of the Device class can be defined as "a device that generates data and receives a command".

Then, the tool defines the relationship between classes and between a class and an instance by using properties, and outputs the results. The above-described problems lie in such procedures.

The present invention has been made in view of the above-described circumstances, and an object thereof is to provide an ontology creation apparatus, method, and program that can simplify the creation of ontology related to data exchange and prevent erroneous creation.

Means for Solving the Problem

To achieve the above-described object, a first aspect of an ontology creation apparatus according to an embodiment of the present invention includes: a first storage device that stores information that represents definitions of candidates for classes of ontology; a first selection unit that receives an input operation that is performed based on the information stored in the first storage device and representing the definitions, to select a class from among the candidate classes of ontology; a second storage device that stores information that represents definitions of properties that indicate connection relationships between classes that serve as objects and classes that serve as subjects; an acquisition unit that acquires a candidate class of a subject corresponding to an object when the class selected by the first selection unit is determined as the object, based on the information stored in the second storage device and representing the definitions; a second selection unit that receives an input operation for selecting an instance that belongs to a class of a subject corresponding to an object when the class selected by the first selection unit is determined as the object, performed based on the candidate class of a subject acquired by the acquisition unit; a relationship setting unit that sets a connection relationship between instances that belong to the class of ontology selected by the first selection unit and the instance selected by the second selection unit; and an output unit that creates and outputs ontology that indicates the class of ontology selected by the first selection unit, the instance selected by the second selection unit, and the connection relationship set by the relationship setting unit.

A second aspect of the ontology creation apparatus according to the present invention is the first aspect further including: a third storage device that stores information that represents definitions of candidate properties that indicate relationships between classes and literals; a second acquisition unit that acquires a literal corresponding to a class related to a set of instances that include the instances belonging to the class selected by the first selection unit and the instance selected by the second selection unit, based on the information stored in the third storage device and representing the definitions of the candidate properties; and an edition unit that receives an input operation related to edition of the literal acquired by the second acquisition unit.

A third aspect of the ontology creation apparatus according to the present invention is the first aspect, wherein the output unit creates at least one of: information indicating relationships between the class of ontology selected by the first selection unit and the instances belonging to the class; information indicating relationships between instances belonging to the set of instances including the instances belonging to the class of ontology selected by the first selection unit and the instance selected by the second selection unit; and information indicating relationships between the instances belonging to the set of instances and literals, converts the generated information into ontology, and outputs the ontology.

A fourth aspect of the ontology creation apparatus according to the present invention is the second aspect, wherein the literal acquired by the second acquisition unit is of a data type of an instance that belongs to the set of instances.

One aspect of an ontology creation method that is carried out by an ontology creation apparatus according to an embodiment of the present invention includes: selecting a class based on information that is stored in a first storage device and represents definitions of candidate classes of ontology, in response to an input operation; acquiring a candidate class of a subject corresponding to an object when the selected class is determined as the object, based on information that is stored in a second storage device and represents definitions of properties that indicate connection relationships between classes that serve as objects and classes that serve as subjects; selecting an instance that belongs to a class of a subject corresponding to an object when the selected class is determined as the object, based on the acquired candidate class of a subject, in response to an input operation; setting a connection relationship between instances that belong to the selected class of ontology and the selected instance; and creating and outputting ontology that indicates the selected class of ontology, the selected instance, and the set connection relationship.

One aspect of an ontology creation processing program according to an embodiment of the present invention enables a processor to function as the units included in the ontology creation apparatus according to any one of the first to fourth aspects.

Effects of the Invention

The first aspect of the ontology creation apparatus according to an embodiment of the present invention selects a class based on information that represents definitions of candidate classes of ontology, in response to an input operation; acquires a candidate class of a subject when the selected class is determined as the object, based on information that represents definitions of properties that indicate connection relationships between classes that serve as objects and classes that serve as subjects; selects an instance belonging to the class of the subject when the selected class is determined as the object, based on the acquired candidates, in response to an input operation; sets a connection relationship between the selected class and instance; and creates and outputs ontology that indicates the selected class, the instance, and the set connection relationship. Therefore, it is possible to simplify the creation of ontology, and avoid creating incorrect ontology.

The second and fourth aspects of the ontology creation apparatus according to an embodiment of the present invention can acquire a literal related to a class to which the set of instances belong, based on information that represents definitions of candidate properties that indicate relationships between classes and literals, and edit the literal. Therefore, the user is prevented from misrecognizing an editable literal.

The third aspect of the ontology creation apparatus according to an embodiment of the present invention converts information indicating relationships between classes and instances, information indicating relationships between instances, and information indicating instances and literals into ontology and outputs the ontology. Therefore, it is possible to output ontology that is based on classes, instances, and literals that have been appropriately selected or edited.

That is to say, according to the aspects of the present invention, it is possible simplify the creation of ontology related to data exchange, and avoid creating incorrect ontology.

DESCRIPTION OF EMBODIMENTS

The following describes an embodiment according to the present invention with reference to the drawings.

An ontology creation apparatus according to an embodiment of the present invention employs a GUI (Graphical User Interface), and when creating an ontology, the ontology creation apparatus provides an ontology operation application with necessary restrictions, and also simplifies creation of ontology.

First, classes that can be created are prepared as templates, and thus unexpected instances of classes are prevented from being created.

Second, subject instances that are acceptable in terms of design are automatically selected and activated using the relationship (predicate) between the originally designed classes, and the subject instance is selected by the user from among the selected results. As a result, it is possible to avoid creating incorrect properties.

Third, DatatypeProperty that can be created for each instance is selected by the system by automatically referencing the relationship between the class and the property, which is the original design, so that the user can edit it. As a result, it is also possible to avoid creating incorrect attributes.

As described above, not only grammatical restrictions in ontology but also semantic restrictions necessary in actual operation are provided. Thus, it is possible to simplify creation of ontology, and avoid creating incorrect ontology.

In addition, the ontology creation apparatus can support a case in which creation of ontology is left to an end user, a case in which a user does not have sufficient knowledge regarding ontology, and so on. Thus, it may be possible to accelerate promotion of applications that employ ontology.

Figure 1:
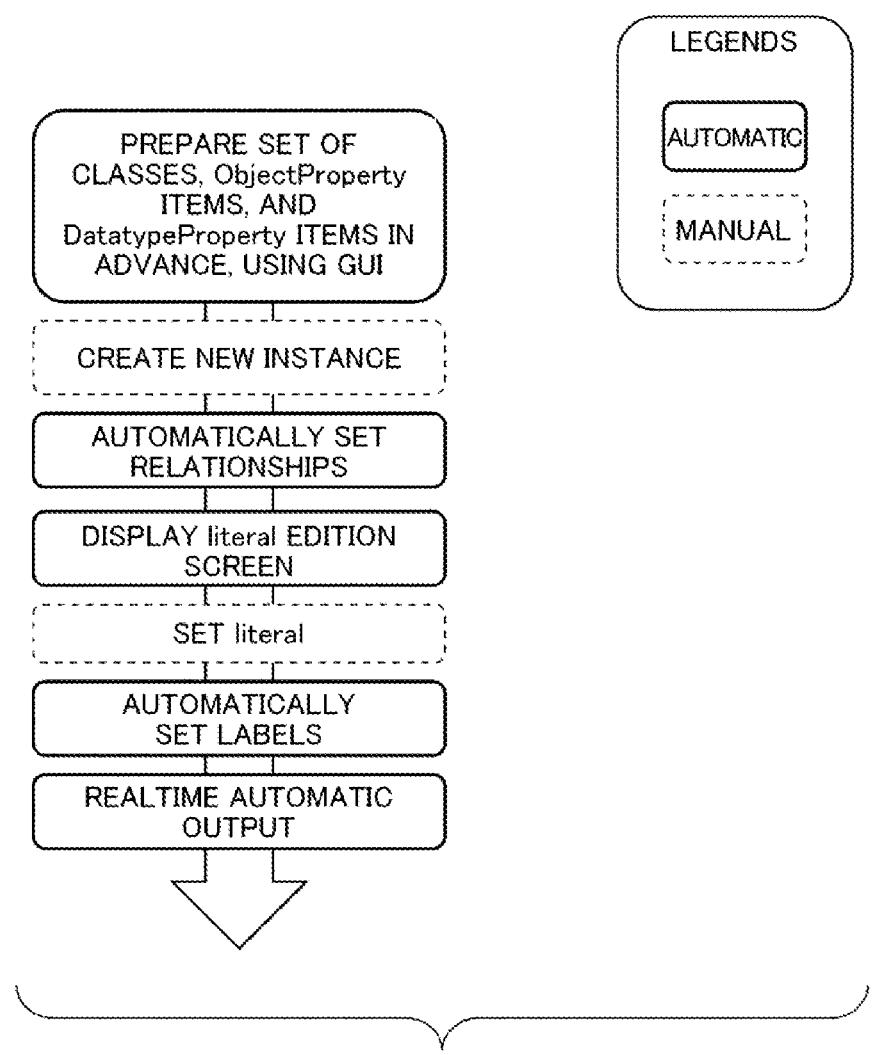
FIG. 1 is a diagram showing an example of a procedure performed by an ontology creation apparatus according to an embodiment of the present invention.

Next, a procedure for creating ontology with restrictions using a GUI will be described. FIG. 1 is a diagram showing an example of a procedure performed by an ontology creation apparatus according to an embodiment of the present invention.

Unlike conventional ontology construction processes, the ontology creation apparatus according to an embodiment of the present invention provides restrictions by using a GUI at the time of creating ontology to effectively avoid creating incorrect ontology, and prevents ontology and design from being inconsistent with each other.

For example, in a conventional procedure, a set of classes, instances, ObjectProperty, and DatatypeProperty are newly created, the relationship between classes to which labels and instances belong, and literal (API) are set, and they are output after consistency is verified. The entire procedure is performed by a user (manually).

In contrast, according to an embodiment of the present invention, a set of classes, ObjectProperty, and DatatypeProperty are prepared in advance in a GUI. Here, only limited design classes are prepared. Then, new instances are created through user operation.

Thereafter, the ontology creation apparatus automatically sets the relationship between the classes to which the instances belong, inherits DatatypeProperty of each of the classes to which the instances belong, and automatically displays a literal edit screen corresponding thereto.

Thereafter, literal is set through a user operation, and the ontology creation apparatus automatically sets the labels, and automatically outputs the labels in real time.

Next, an overview of a GUI for creating ontology with restrictions will be described.

Figure 2:
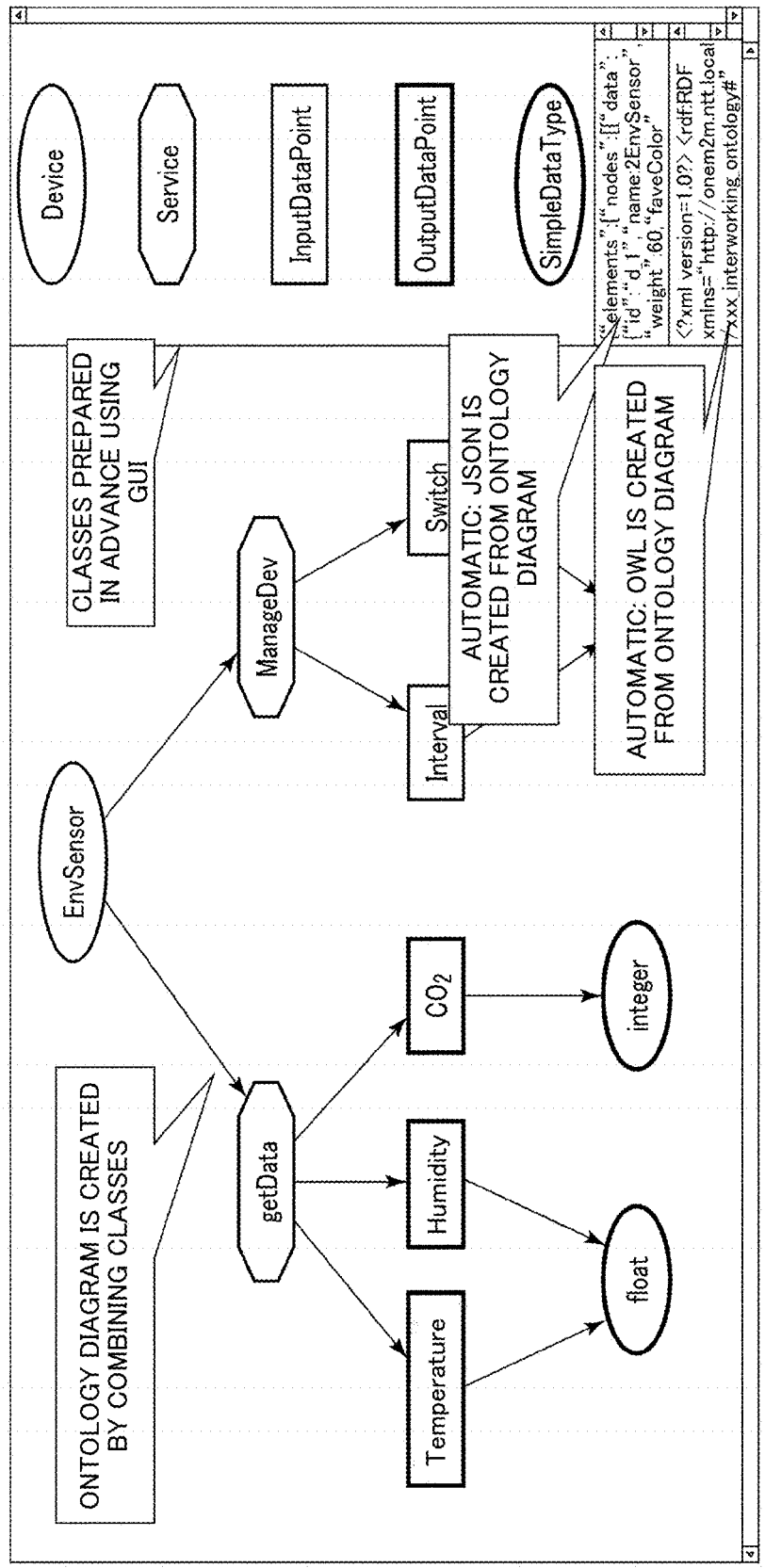
FIG. 2 is a diagram showing an example of a screen configuration of a GUI for creating ontology with restrictions.

First, a screen configuration of a GUI for creating ontology with restrictions will be described. FIG. 2 is a diagram showing an example of a screen configuration of a GUI for creating ontology with restrictions.

In the example shown in FIG. 2, the classes prepared in advance using the GUI (Device, Service, InputDataPoint, OutputDataPoint, and SimpleDataType) are displayed. An ontology diagram can be created by combining the classes thus displayed.

An OWL (Web Ontology Language) and a JSON are automatically created from the ontology diagram thus created.

Next, a configuration of a GUI system for creating ontology with restrictions (an ontology creation apparatus) will be described.

Figure 3:
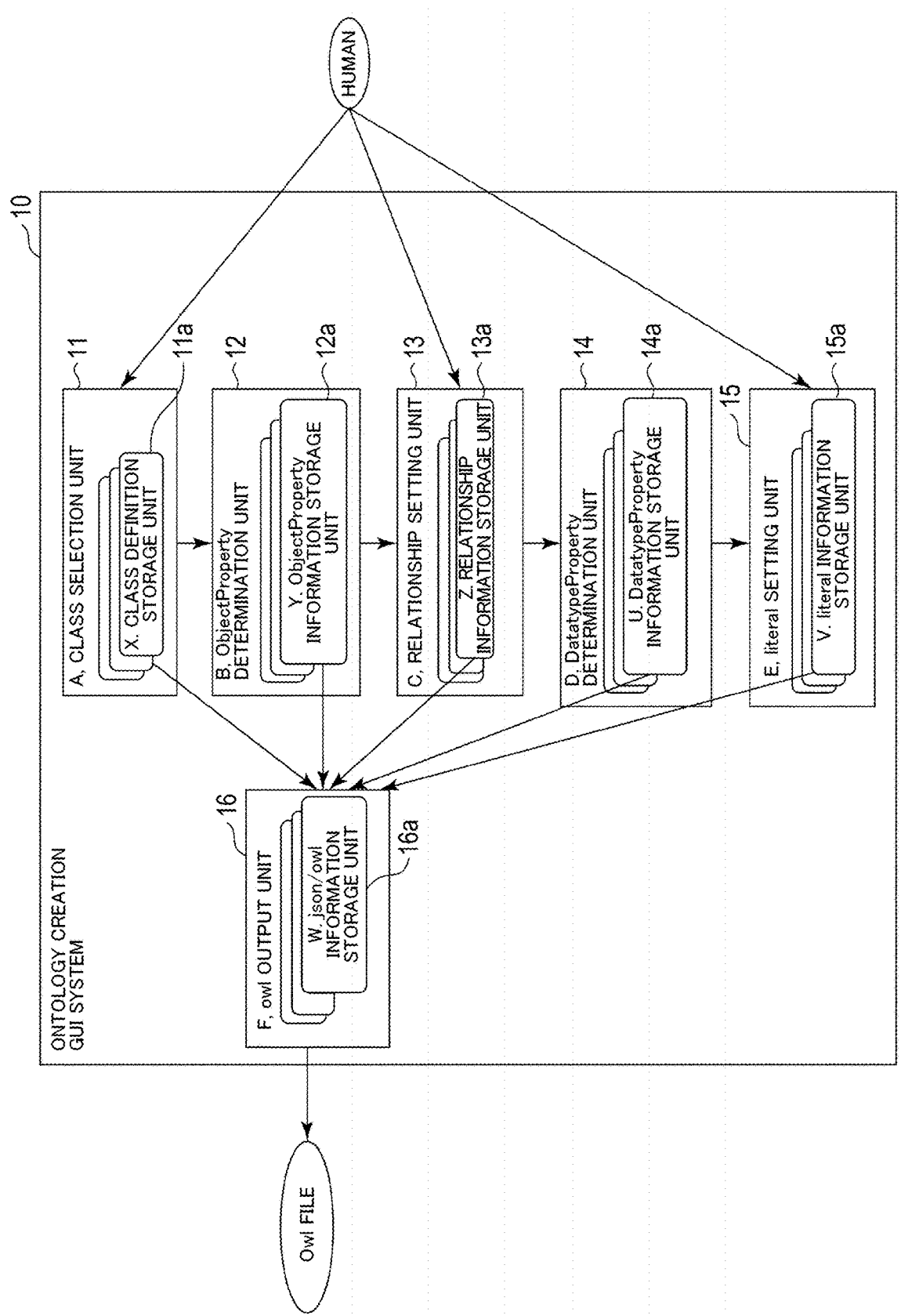
FIG. 3 is a diagram showing an example of a configuration of an ontology creation GUI system according to an embodiment of the present invention.

FIG. 3 is a diagram showing an example of a configuration of an ontology creation GUI system according to an embodiment of the present invention.

The functions of an ontology creation GUI system 10 shown in FIG. 3 are realized using a processor that executes a program, such as a CPU (Central Processing Unit), storage media such as a RAM (Random Access Memory) and a ROM (Read Only Memory), an input device such as a keyboard, and a display device such as a display.

The ontology creation GUI system 10 includes a class selection unit 11 (A, which may also be denoted as a class selection unit), an ObjectProperty determination unit 12, (B, which may also be denoted as an ObjectProperty determination unit), and a relationship setting unit 13 (C, which may also be denoted as a relationship setting unit).

The ontology creation GUI system 10 also includes a DatatypeProperty determination unit 14 (D, which may also be denoted as a DatatypeProperty determination unit), a literal setting unit 15 (E, which may also be denoted as a literal setting unit), and an owl output unit 16 (F, which may also be denoted as owl output unit).

The class selection unit 11 includes a class definition storage unit (which may also be denoted as a storage unit (storage device) X) 11a. The ObjectProperty determination unit 12 includes an ObjectProperty information storage unit (which may also be denoted as a storage unit Y) 12a. The relationship setting unit 13 includes a relationship information storage unit (which may also be denoted as a storage unit Z) 13a.

The DatatypeProperty determination unit 14 includes a DatatypeProperty information storage unit (which may also be denoted as a storage unit U) 14a. The literal setting unit 15 includes a literal information storage unit (which may also be denoted as a storage unit V) 15a. The owl output unit 16 includes a json/owl information storage unit (which may also be denoted as a storage unit W) 16a.

Information to be stored in the storage units X, Y, and U are set in advance.

In the storage unit X, the following set of design classes are stored in advance. The set of design classes are pieces of information that each represent the definitions of candidate classes of ontology.

Set of design classes $\{C_1, C_2, \ldots, C_n\}$: {Device, Service, InputDataPoint, OutputDataPoint, SimpleDataType}

In the store unit Y, a set of design ObjectProperty items, which are pieces of information that each represent the definition of a property that indicates a connection between a class that serves as an object and a class that serves as a subject, such as (1) to (4) shown below, are stored in advance.

Set of design ObjectProperty items $\{OP_1, OP_2, \ldots, OP_n\}$:
(1) $OP_1$: hasService: (Subject) Device→(Object) Service
(2) $OP_2$: hasInputDataPoint: (Subject) Service→(Object) InputDataPoint
(3) $OP_3$: hasOutputDataPoint: (Subject) Service→(Object) OutputDataPoint
(4) $OP_3$: hasDatatype: (Subject) InputDataPoint→(Object) SimpleDataType⊕
(Subject) InputDataPoint→(Object) SimpleDataType In the storage unit U, a set of design DatatypeProperty items, which are pieces of information that each represent the definition of a property candidate, such as (1) to (5) shown below, are stored in advance. Each property indicates a relationship between a class and a literal.

Figure 4:
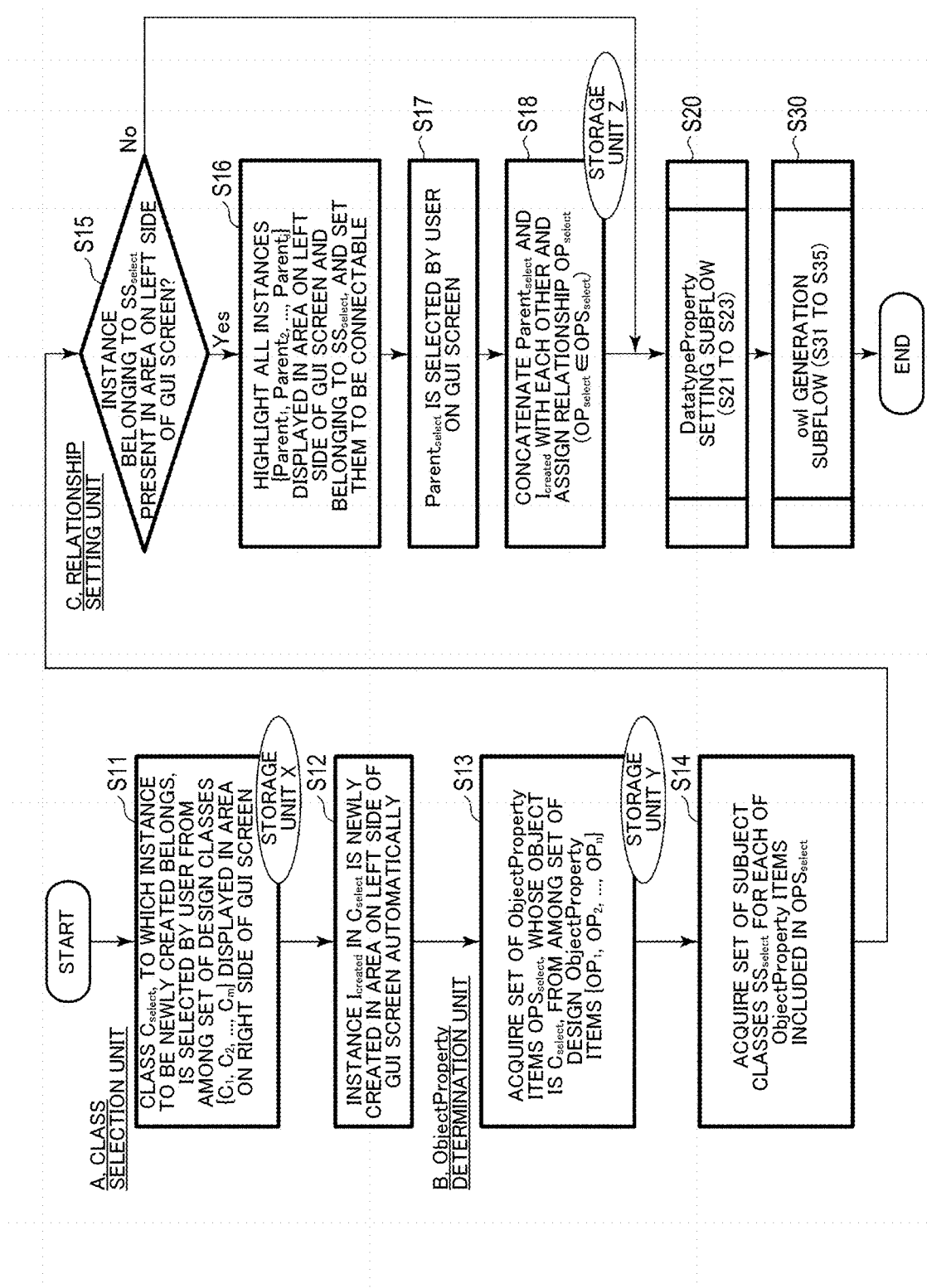
FIG. 4 is a diagram showing an example of a workflow related to creation of a new instance.

Set of Design DatatypeProperty items $\{DP_1, DP_2, \ldots, DP_n\}$:
(1) $DP_1$: rdfs: about: (Subject) all classes→literal
(2) $DP_2$: hasAPI: Subject Service|InputDataPoint|OutputDataPoint→literal
(3) $DP_3$: storeTimeseries: (Subject) Service|OutputDataPoint→literal
(4) $DP_4$: onDemand: (Subject) OutputDataPoint→literal
(5) $DP_5$: onDemandTS: (Subject) OutputDataPoint→literal Next, a workflow related to the creation of a new instance will be described. FIG. 4 is a diagram showing an example of a workflow related to the creation of a new instance.

First, the class selection unit 11 selects a class $C_{select}$, to which an instance that is to be newly created belongs, from among the set of design classes $\{C_1, C_2, \ldots, C_n\}$ displayed in the area on the right side of the GUI screen (the creation screen as shown in FIG. 2), according to a user operation, and stores the result of selection in the storage unit X (S11).

The class selection unit 11 newly creates the instance $I_{created}$ in the $C_{select}$ selected in S11 in the area on the left side of the GUI screen according to a user input operation or automatically (S12).

The ObjectProperty determination unit 12 acquires a set of ObjectProperty items $OPS_{select}$, whose object is the $C_{select}$ selected in S11 from among the set of design ObjectProperty items $\{OP_1, OP_2, \ldots, OP_n\}$ stored in the storage unit Y (S13).

The ObjectProperty determination unit 12 acquires the set of classes $SS_{select}$, which are subjects and are defined by the ObjectProperty items included in the $OPS_{select}$ acquired in step S13 (S14). The results of acquisition are class candidates that can be set as the subject corresponding to the object when the class selected in S11 is determined as the object.

The relationship setting unit 13 determines whether or not an instance that belongs to the set of classes $SS_{select}$ acquired in step S13 is present in the area on the left side of the GUI screen (S15). If such an instance is present (Yes in S15), the relationship setting unit 13 highlights and displays all the instances $\{Parent_1, Parent_1, \ldots, Parent_n\}$ displayed in the area on the right side of the GUI screen and belonging to the set of classes $SS_{select}$ acquired in S13. The relationship setting unit 13 sets the instances to be able to be concatenated with each other according to a user operation.

Upon a desired instance $Parent_{select}$ being selected on the GUI screen according to a user input operation (S17), the relationship setting unit 13 concatenates the selected instance $Parent_{select}$ and the instance $I_{created}$ created in S12 with each other, and renders a line segment indicating this concatenation on the GUI screen. The relationship setting unit 13 assigns each concatenated instance a property (ObjectProperty) $OP_{select}$ ($OP_{select} \in OPS_{select}$) indicating the relationship between these instances, and stores this property in the storage unit Z (S18).

After S18, or if no instance is present in S15 (No in S15), a DatatypeProperty setting subflow (S20: S21 to S23) and an owl generation subflow (S30: S31 to S35) are carried out and processing ends.

Figure 5:
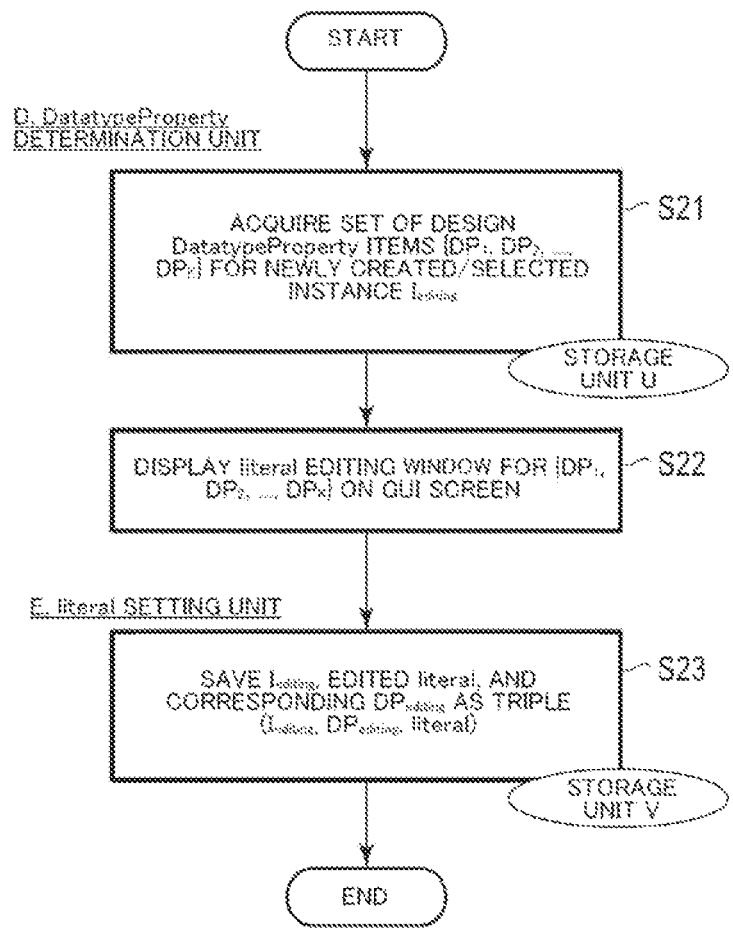
FIG. 5 is a diagram showing an example of a DatatypeProperty setting subflow.

Next, the DatatypeProperty setting subflow will be described. FIG. 5 is a diagram showing an example of the DatatypeProperty setting subflow.

Upon the DatatypeProperty setting subflow being started, the DatatypeProperty determination unit 14 acquires instances belonging to the class to which an instance $I_{editing}$ created in S12 belongs, and a set of DatatypeProperty items related to the instance selected in S17, from the set of design DatatypeProperty items $\{DP_1, DP_2, \ldots, DP_n\}$ stored in the storage unit U (S21). The results of acquisition correspond to literals respectively related to the instances belonging to the class selected in S11 and the instances selected in S17.

The DatatypeProperty determination unit 14 displays an editing window for editing the literals defined by the set of DatatypeProperty items acquired in S21, on the GUI screen (S22). The user can edit the literals on this screen through an input operation.

The literal setting unit 15 stores information ($I_{editing}$, $DP_{editing}$, literal) in which $I_{editing}$ created in S12, the above-described edited literals, and $DP_{editing}$, editing which is a DatatypeProperty corresponding to the literal, are associated with each other, in the storage unit V (S23). Thus, the DatatypeProperty setting subflow is complete.

Figure 6:
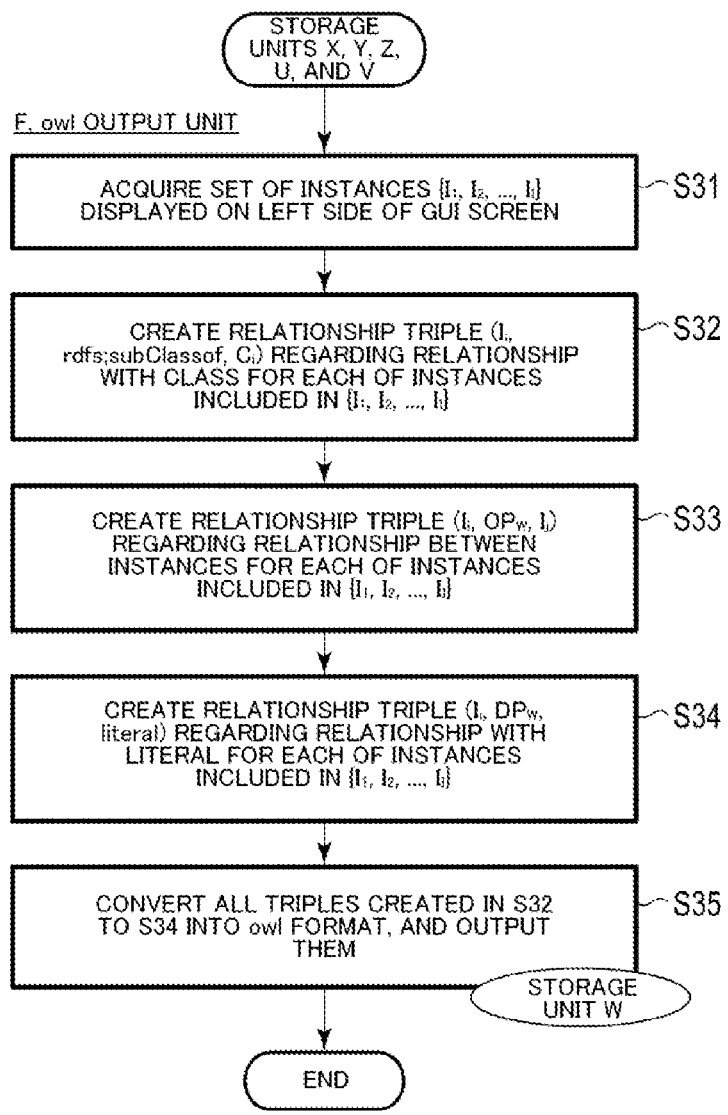
FIG. 6 is a diagram showing an example of an owl output subflow.

Next, an owl output subflow will be described. FIG. 6 is a diagram showing an example of the owl output subflow.

Upon the owl output subflow being started, the owl output unit 16 acquires a set of instances $\{I_1, I_2, \ldots, I_n\}$ belonging to the respective classes and displayed in the area on the left side of the GUI screen, from the storage units X, Y, Z, U, and V (S31). This set of instances include the instances belonging to the class acquired in S11 and the instance selected in S17.

The owl output unit 16 creates, for the set of instances $\{I_1, I_2, \ldots, I_n\}$ acquired in S31, information ($I_i$, rafs:subClassof, $C_i$) indicating the relationships between the instances and the classes to which the instances belong (S32).

The owl output unit 16 creates information ($I_i$, $OP_W$, $I_j$) indicating the relationships between the instances included in the set of instances $\{I_1, I_2, \ldots, I_n\}$ acquired in S31 (S33). The results of creation indicate the relationship between two instances belonging to the set of instances that include the instance belonging to the class selected in S11 and the instance selected in S17.

The owl output unit 16 creates, for each of the instances included in the set of instances $\{I_1, I_2, \ldots, I_n\}$ acquired in S31, information ($I_i$, $DP_W$, $I_j$) indicating the relationship between the instance and the literal (S34). The results of creation indicate the relationships between the instances included in the above-described set of instances and literals.

The owl output unit 16 converts each of the pieces of information created in S32 to S34 into an owl format, stores them in the storage unit W, and outputs them to the outside (S35). Thus, the owl output subflow ends.

Figure 7:
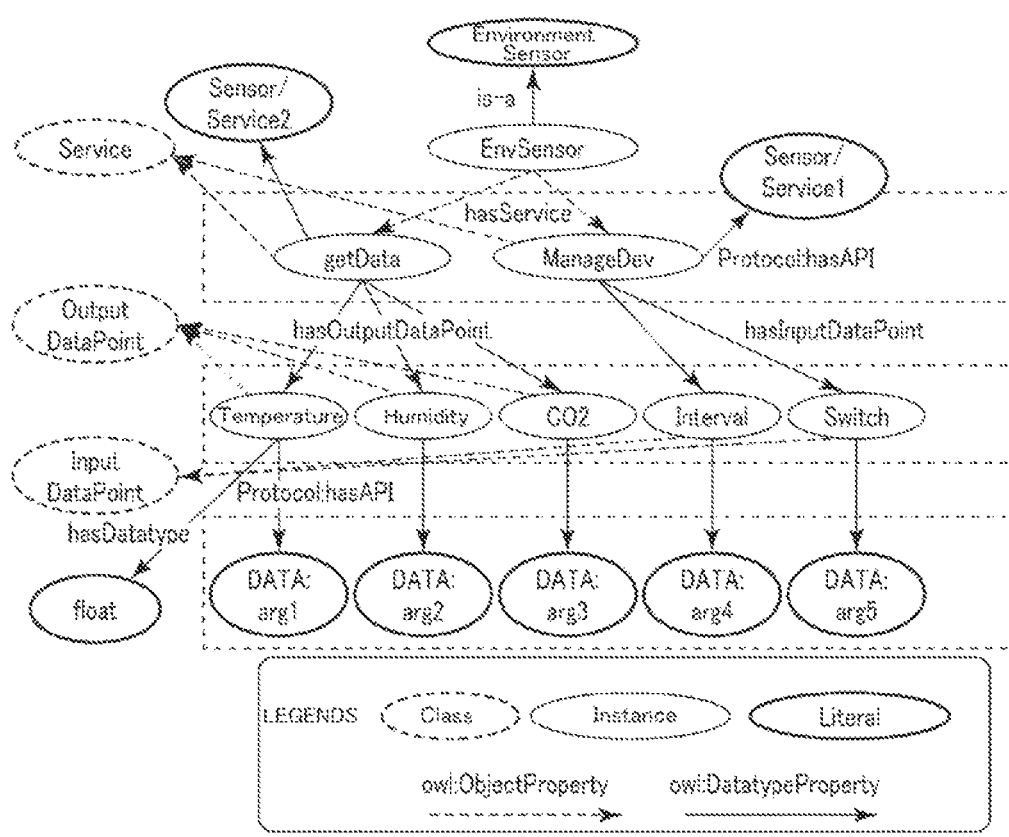
FIG. 7 is a diagram illustrating an example of creation of ontology.

Next, the creation of ontology performed through data formalization for IoT mutual cooperation will be described. FIG. 7 is a diagram illustrating an example of the creation of ontology.

In the example shown in FIG. 7, the instances "getData" and "ManageDev" belong to the class "Service", the instances "Temperature", "Humidity", and "CO2" belong to the class "OutputDataPoint", and the instances "Interval" and "Switch" belong to the class "InputDataPoint".

In the example shown in FIG. 7, the instance "EnvSensor" is associated with the instances "getData" and "ManageDev", using the ObjectProperty "hasService".

The instance "getData" is associated with the instances "Temperature", "Humidity", and "CO2", using the ObjectProperty "hasOutputDataPoint".

The instance "ManageDev" is associated with the instances "Interval" and "Switch", using the ObjectProperty "hasInputDataPoint".

In the example shown in FIG. 7, the instance "EnvSensor" is associated with the literal "Environment sensor", using the DatatypeProperty "is-a".

The instance "ManageDev" is associated with the literal "Sensor/Service1", using the DatatypeProperty "hasAPI".

The instance "getData" is associated with the literal "Sensor/Service2", using the DatatypeProperty "hasAPI".

In the example shown in FIG. 7, the instance "Temperature" is associated with the literal "DATA:arg(argument)1", using the DatatypeProperty "hasAPI".

The instance "Humidity" is associated with the literal "DATA:arg2", using the DatatypeProperty "hasAPI".

The instance "CO2" is associated with the literal "DATA:arg3", using the DatatypeProperty "hasAPI".

The instance "Interval" is associated with the literal "DATA:arg4", using the DatatypeProperty "hasAPI".

The instance "Switch" is associated with the literal "DATA:arg5", using the DatatypeProperty "hasAPI".

The instances "Temperature", "Humidity", "CO2", "Interval", and "Switch" are associated with the literal "float", using the DatatypeProperty "hasDatatype".

Figure 8:
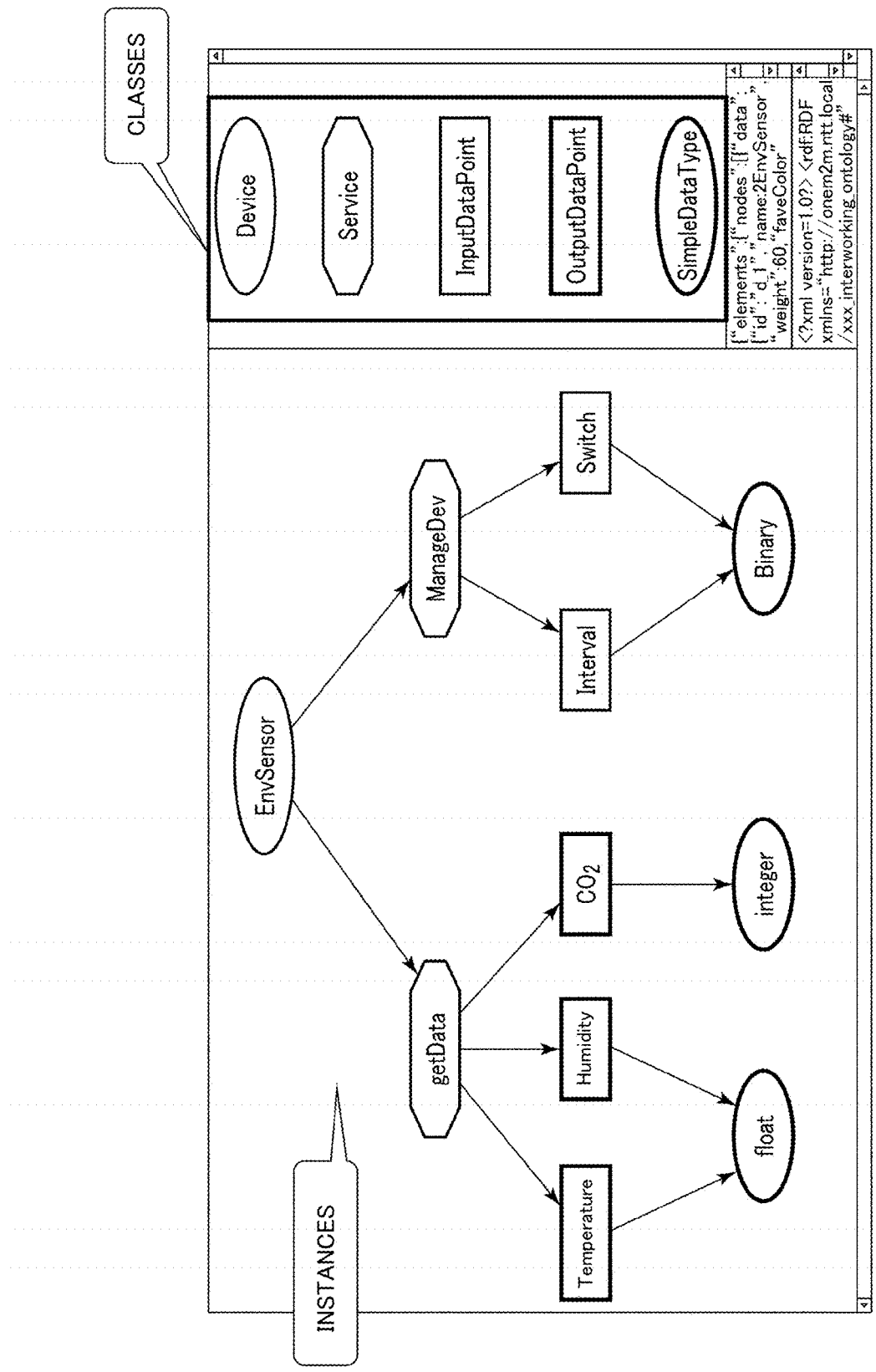
FIG. 8 is a diagram illustrating an example of a GUI screen on which instances that can be created are provided with restrictions.

Next, an example in which the instances that can be created are provided with restrictions on the GUI screen will be described. FIG. 8 is a diagram illustrating an example of a GUI screen on which instances that can be created are provided with restrictions.

In the example shown in FIG. 8, the user can create (render) instances in the area on the left side of the GUI screen, using the class candidates "Device", "Service", "InputDataPoint", "OutputDataPoint", and "SimpleDataType", which are candidates prepared in the area on the right side of the GUI screen. In the example shown in FIG. 8, the following (1) to (7) are created.

(1) The instance "EnvSensor" belonging to the class "Device".

(2) The instances "getData" and "ManageDev" that are in the tier below the instance "EnvSensor" and belong to the class "Service".

(3) The instances "Temperature", "Humidity", and "CO2" that are in the tier below the instance "getData" and belong to the class "OutputDataPoint".

(4) The instance "float" that is in the tier below the instances "Temperature" and "Humidity" and belongs to the class "SimpleDataType".

(5) The instance "integer" that is in the tier below the instance "CO2" and belongs to the class "SimpleDataType".

(6) The instances "Interval" and "Switch" that are in the tire below the instance "ManageDev" and belong to the class "InputDataPoint".

(7) The instance "Binary" that is in the tier below the instances "Interval" and "Switch" and belongs to the class "SimpleDataType".

Figure 9:
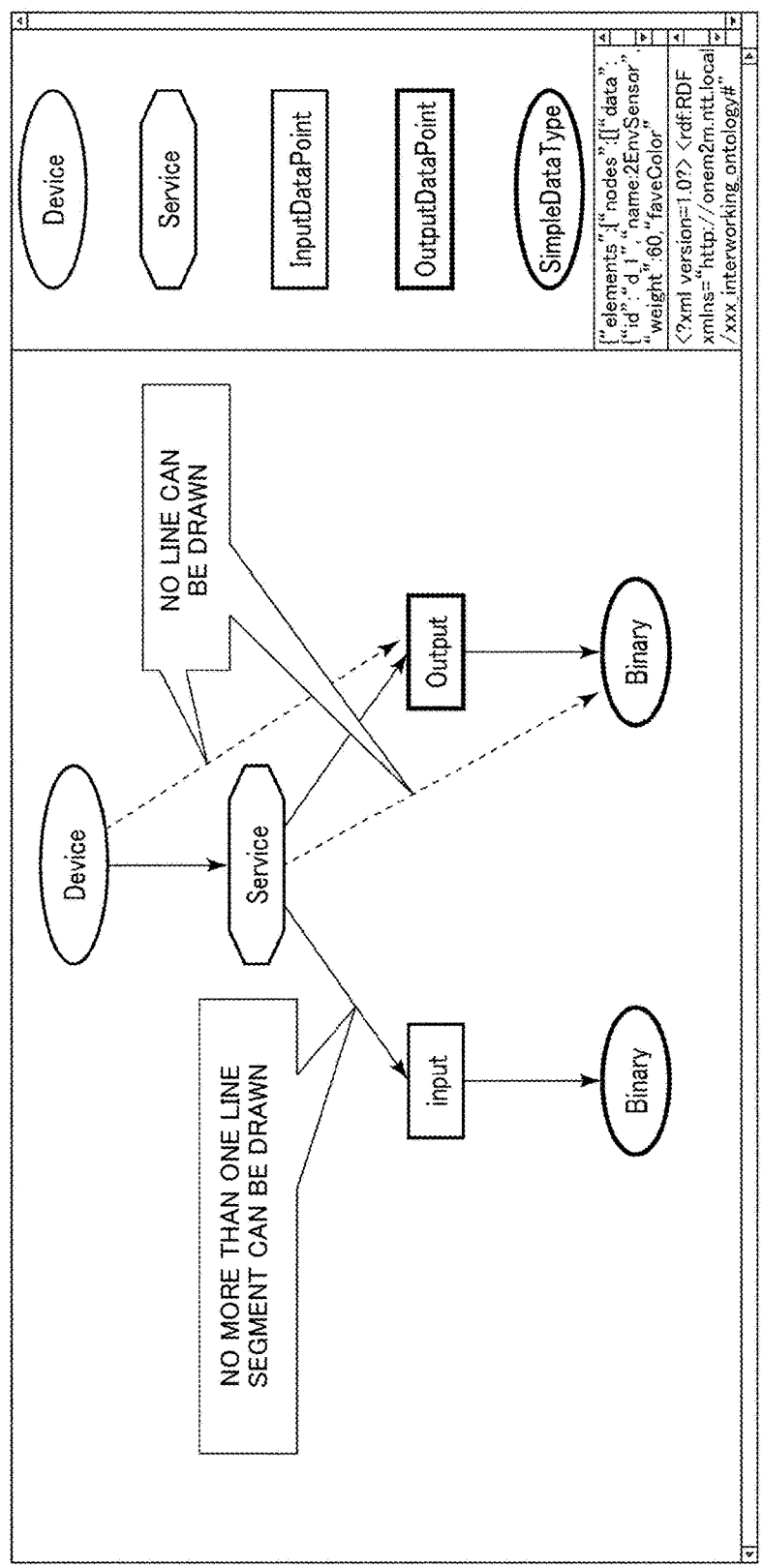
FIG. 9 is a diagram illustrating an example of a GUI screen on which relationships between instances are provided with restrictions.

Next, an example in which relationships between instances are provided with restrictions on the GUI screen will be described. FIG. 9 is a diagram illustrating an example of a GUI screen with which instances that can be created are provided with restrictions.

A line segment that indicates the relationship between instances can be rendered on the GUI screen only as a line segment that indicates a relationship conforming to the design ObjectProperty items. A line segment that indicates a relationship that does not conform to the design ObjectProperty items cannot be rendered on the GUI screen, and such a relationship cannot be set by the relationship setting unit 13.

In the example shown in FIG. 9, a line segment cannot be rendered between the instance belonging to the class "Device" and the instance belonging to the class "OutputDataPoint" on the GUI screen.

Also, in the example shown in FIG. 9, although one line segment that indicates a relationship can be rendered between the instance belonging to the class "Service" and the instance belonging to the class "InputDataPoint" on the GUI screen, no more than one line segment can be rendered between the same instances.

Next, an example in which the DatatypeProperty of each instance is provided with restrictions will be described.

Figure 10:
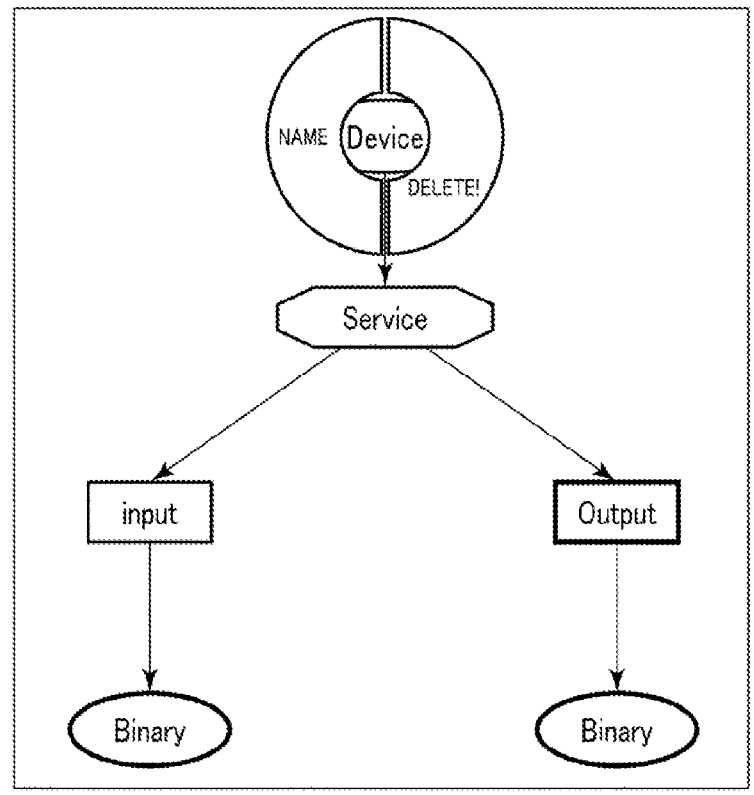
FIG. 10 is a diagram illustrating an example of a GUI screen with which DatatypeProperty of instances are provided with restrictions.
Figure 11:
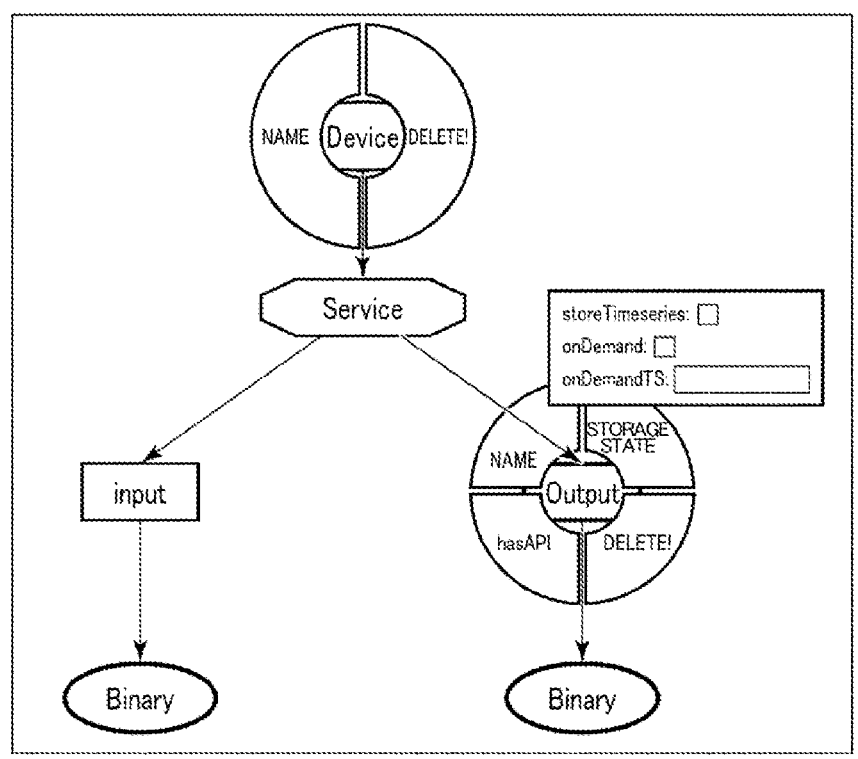
FIG. 11 is a diagram illustrating an example of a GUI screen with which DatatypeProperty of instances are provided with restrictions.

FIGS. 10 and 11 are diagrams illustrating an example of the GUI screen on which the DatatypeProperty of each instance is provided with restrictions.

In the example shown in FIG. 10, regarding the nodes related to the classes "Device" and the "SimpleDataType", the DatatypeProperty items that can be set for instances are limited to "NAME: name change" and "DELETE: deletion".

Also, in the example shown in FIG. 11, regarding the nodes related to the classes "Service", "InputDataPoint", and "OutputDataPoint", the DatatypeProperty items that can be set for instances are limited to "NAME: name change", "DELETE: deletion", "hasAPI", and "storage state (store-Timeseries (storing time-series data), onDemand (acquiring data in response to a request from an application), and onDemandTS (acquiring time-series data in response to a request from an application))".

Figure 12:
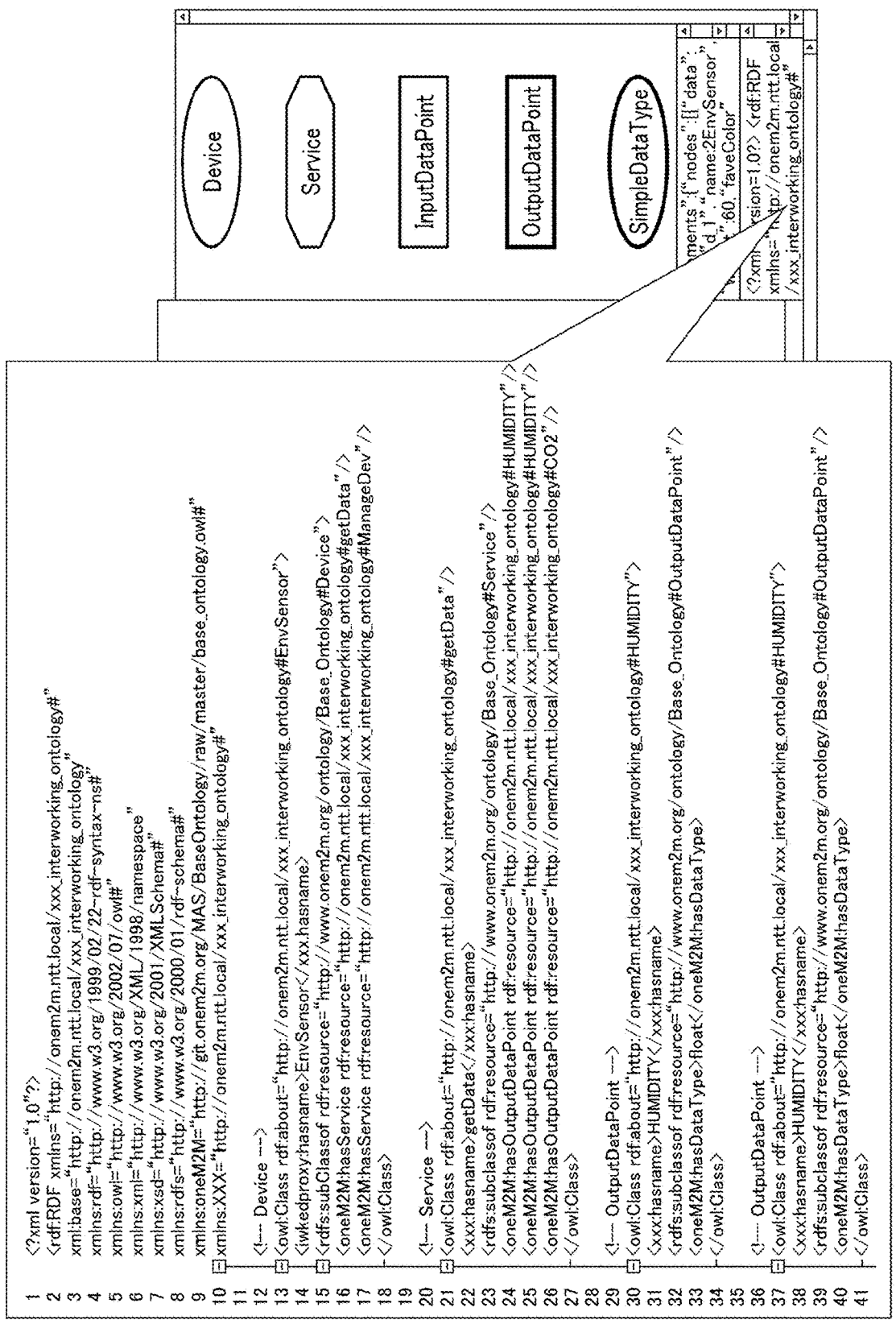
FIG. 12 is a diagram illustrating an example of an ontology output.

Next, an example of an ontology output will be described. FIG. 12 is a diagram illustrating an example of an ontology output.

When the classes and the instances related to the sensor indicated by EnvSensor as shown in FIG. 7 described above are rendered on the GUI screen as shown in FIG. 8, the following OWL files are created by the owl output unit 16 as shown in FIG. 12. The aforementioned "following OWL files" are ontology of a light device that is provided with a $CO_2$ sensor, a temperature sensor, and an ON/OFF switch.

Figure 13:
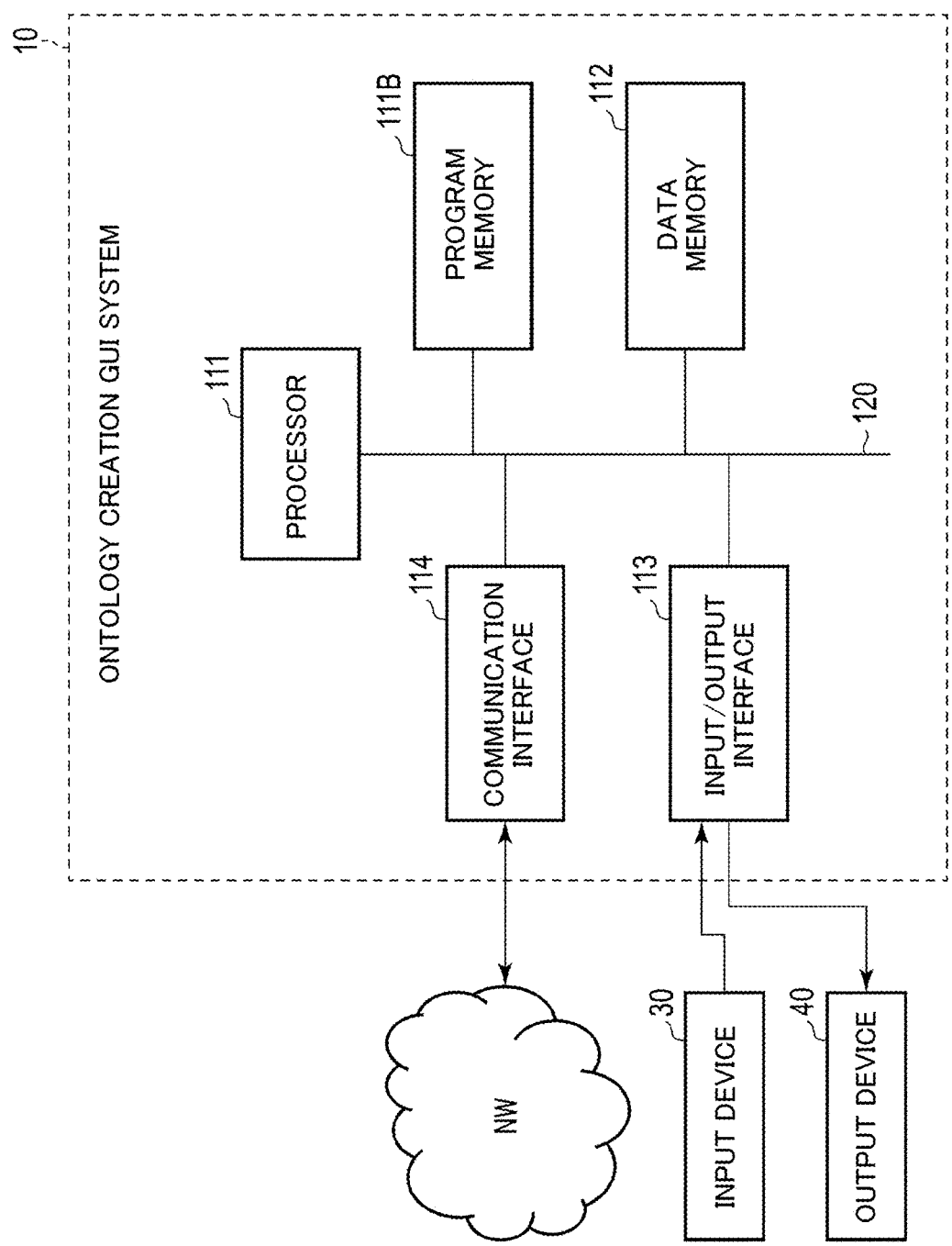
FIG. 13 is a block diagram showing an example of a hardware configuration of an ontology creation GUI system according to an embodiment of the present invention.
Figure 14:
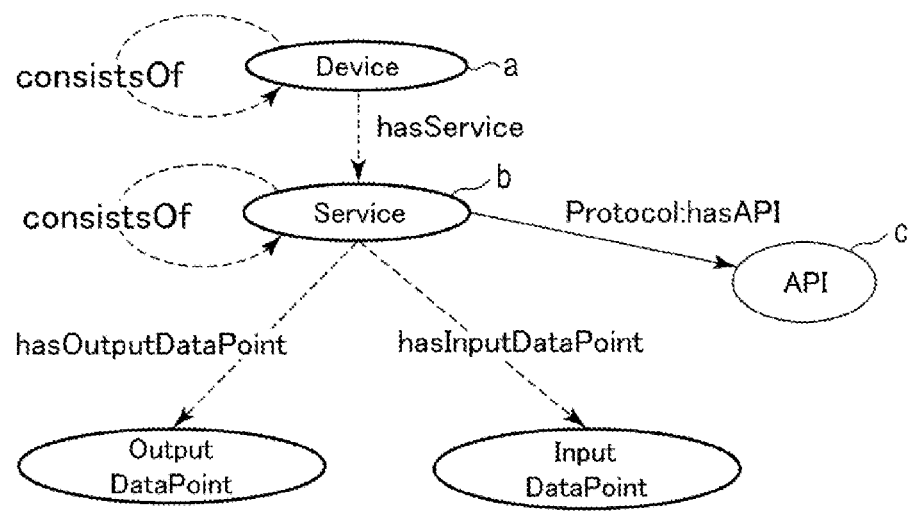
FIG. 14 is a diagram illustrating an example of ontology construction in IoT.

FIG. 13 is a block diagram showing an example of a hardware configuration of an ontology creation GUI system according to an embodiment of the present invention.

In the example shown in FIG. 13, the ontology creation GUI system 10 according to the above-described embodiment is constituted by, for example, a server computer or a personal computer, and includes a hardware processor 111A such as a CPU. A program memory 111B, a data memory 112, an input/output interface 113, and a communication interface 114 are connected to the hardware processor 111A via a bus 120.

The communication interface 114 includes, for example, one or more wireless communication interface units, and realizes reception/transmission information from/to a communication network NW. For example, an interface that employs a low-power wireless data communication standard, such as a wireless LAN (Local Area Network), is used as a wireless interface.

An input device 30 and an output device 40 for an operator, which are attached to the ontology creation GUI system 10, are connected to the input/output interface 113.

The input/output interface 113 receives operation data input by an operator through the input device 30 such as a keyboard, a touch panel, a touchpad, or a mouse, and performs processing to output data to be output, to the output device 40, which includes a display device in which liquid crystal, organic EL (Electro Luminescence), or the like is used, and display the data. Note that devices that are built into the ontology creation GUI system 10 may be used as the input device 30 and the output device 40, or an input device and an output device of another information terminal that can communicate with the ontology creation GUI system 10 via the network NW may be used as them.

The program memory 111B is realized using, for example, a combination of a non-volatile memory that is writable/readable at any time, such as an HDD (Hard Disk Drive) or an SSD (Solid State Drive), and a non-volatile memory such as a ROM (Read Only Memory) as a non-transitory tangible storage medium, and stores a program that is required for carrying out various kinds of control processing according to an embodiment.

The data memory 112 is realized using, for example, a combination of the above-described non-volatile memory and a volatile memory such as a RAM (Random Access Memory) as a tangible storage medium, and is used to store various kinds of data acquired or created during various kinds of processing.

The ontology creation GUI system 10 according to an embodiment of the present invention can be configured as a data processing apparatus that includes the class selection unit 11, the ObjectProperty determination unit 12, the relationship setting unit 13, the DatatypeProperty determination unit 14, the literal setting unit 15, and the owl output unit 16 shown in FIG. 3 and so on, as software processing functional units.

The class definition storage unit 11a, the ObjectProperty information storage unit 12a, the relationship information storage unit 13a, the DatatypeProperty information storage unit 14a, the literal information storage unit 15a, and the json/owl information storage unit 16a can be formed using the data memory 112 shown in FIG. 13. However, these storage units are not necessarily provided within the ontology creation GUI system 10, and may be provided in an external storage medium such as a USB (Universal Serial Bus) memory, or a storage device such as a database server provided in a cloud.

All of the respective processing functional units of the above-described class selection unit 11, the ObjectProperty determination unit 12, the relationship setting unit 13, the DatatypeProperty determination unit 14, the literal setting unit 15, and the owl output unit 16 can be realized by causing the above-described hardware processor 111A to read out and execute a program stored in the program memory 111B. Note that one or more or all of the processing functional units may be realized in various forms, including the form of an integrated circuit such as an ASIC (Application Specific Integrated Circuit) or an FPGA (Field-Programmable Gate Array).

As described above, the ontology creation apparatus according to an embodiment of the present invention selects a class based on information representing the definitions of candidate classes of ontology in response to an input operation. The ontology creation apparatus according to an embodiment of the present invention acquires candidates for the class that serves as a subject corresponding to the object when the selected class is determined as the object, based on information representing the definitions of the properties indicating connection relationships between classes that serve as objects and classes that serve as subjects. The ontology creation apparatus according to an embodiment of the present invention selects an instance belonging to the class of the subject when the selected class is determined as the object, based on the acquired candidates, in response to an input operation. The ontology creation apparatus according to an embodiment of the present invention sets a connection relationship between the instances belonging to the selected class and the selected instance. The ontology creation apparatus according to an embodiment of the present invention creates and outputs ontology that indicates the selected class, the selected instance, and the set connection relationship. Thus, the ontology creation apparatus according to an embodiment of the present invention can simplify the creation of ontology, and avoid creating incorrect ontology.

In other words, in an IoT system, when ontology is frequently updated due to the addition of a data provider or a change in a sensor device, an IoT system administrator can create a correct and appropriate ontology in a relatively short time even if they are not familiar with ontology. This is because a GUI on which restrictions regarding grammar of ontology or practical operations have been set in advance is used.

In addition, the method described in each embodiment can be transmitted and distributed in the form of programs (a software means) that can be executed by a computing device (computer), by storing the programs in a recording medium such as a magnetic disk (a Floppy (registered trademark) disk, a hard disk, etc.), an optical disc (a CD-ROM, a DVD, an MO, etc.), a semiconductor memory (a ROM, a RAM, a Flash memory, etc.), or by using a communication medium. Note that the programs stored in a medium include a setting program that forms, within a computing device, software means (not only an executable program, but also tables and data structures) that are to be executed by the computing device. The computing device that realizes the present apparatus reads programs recorded on a recording medium or optionally uses a setting program to build a software means, and this software means controls operations to execute the above-described processing. Note that the recording medium mentioned in the present description is not limited to a recording medium that is to be distributed, and may be a magnetic disk, a semiconductor memory, or the like that is provided in the computing device or in a device that is connected via a network.

Note that the present invention is not limited to the above-described embodiments, and may be variously modified at the implementation stage without departing from the spirit thereof. In addition, the embodiments may be implemented in a combination as appropriate. In such a case, combined effects can be achieved. Furthermore, the above-described embodiments include various inventions, and various inventions may be extracted by combining constituent elements selected from among the plurality of constituent elements disclosed herein. For example, if the problems can be solved and the effects can be achieved even when several constituent elements are deleted from the constituent elements described in the embodiments, the deleted constituent elements can be extracted as an invention.

REFERENCE SIGNS LIST

10 Ontology creation GUI system
11 Class selection unit
11a Class definition storage unit
12 ObjectProperty determination unit
12a ObjectProperty information storage unit
13 Relationship setting unit
13a Relationship information storage unit
14 DatatypeProperty determination unit
14a DatatypeProperty information storage unit
15 Literal setting unit
15a Literal information storage unit
16 Owl output unit
16a Json/owl information storage unit

The invention claimed is:

1. An ontology creation apparatus comprising:
a first storage device that stores information that represents definitions of candidate classes of ontology;
a second storage device that stores information that represents definitions of properties that indicate connection relationships between classes that serve as objects and classes that serve as subjects;
a processor; and
a storage medium having computer program instructions stored thereon, when executed by the processor, perform to:
select a class from the candidate classes in the first storage device and in response to an input by a user on a graphical user interface;
creating a particular instance from the selected class in response to another input from the user;
acquiring a set of properties whose object is the selected class, where the set of properties are acquired from the second storage device;
acquiring a set of candidate classes which are subjects and defined by the set of properties;
determining whether one or more instances displayed on the graphical user interface belong to the set of candidate classes;
setting a connection relationship between the particular instance and the one or more instances that belong to the set of candidate classes; and
creating ontology that indicates the particular instance, the one or more instances that belong to the set of candidate classes and the connection relationships therebetween,
wherein the steps of acquiring a set of properties, acquiring a set of candidate classes, determining whether one or more instances and setting a connection relationship are performed automatically by the processor in response to the creation of the particular instance.

2. The ontology creation apparatus according to claim 1, further comprising: a third storage device that stores information that represents definitions of candidate properties that indicate relationships between classes and literals; wherein the computer program instructions further perform to acquire a literal corresponding to a class related to a set of instances that include the instances belonging to selected class and receive an input operation related to edition of the literal.

3. The ontology creation apparatus according to claim 2, wherein the computer program instructions further perform to create information indicating relationships between the selected class and instances belonging to the selected class; information indicating relationships between instances belonging to the set of instances, and information indicating relationships between instances belonging to the set of instances and literals.

4. The ontology creation apparatus according to claim 2, wherein the literal is of a data type of an instance that belongs to the set of instances.

5. An ontology creation method that is carried out by an ontology creation apparatus, comprising:
storing definitions of candidate classes of ontology in a first storage device on the ontology creation apparatus;
selecting a class from the candidate classes in response to an input by a user on a graphical user interface;
storing definitions of properties that indicate connection relationships between classes that serve as objects and classes that serve as subjects in a second storage device on the ontology creation apparatus;
creating a particular instance from the selected class in response to another input from the user;
acquiring a set of properties whose object is the selected class from the second storage device;
acquiring a set of candidate classes which are subjects and defined by the set of properties;
determining whether one or more instances displayed on the graphical user interface belong to the set of candidate classes;

setting a connection relationship between the particular instance and the one or more instances that belong to the set of candidate classes; and creating ontology that indicates the particular instance, the one or more instances that belong to the set of candidate classes and the connection relationships therebetween, wherein the steps of acquiring a set of properties, acquiring a set of candidate classes, determining whether one or more instances and setting a connection relationship are performed automatically by a processor of the ontology creation apparatus and in response to the creation of the particular instance.

\* \* \* \* \*